United States Patent
Ohno et al.

(10) Patent No.: US 8,221,867 B2
(45) Date of Patent: Jul. 17, 2012

(54) HONEYCOMB STRUCTURE (75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 691 days.

(21) Appl. No.: 12/389,338

(22) Filed: Feb. 19, 2009

(65) Prior Publication Data

US 2009/0291256 A1 Nov. 26, 2009

(30) Foreign Application Priority Data

May 20, 2008 (WO) .................. PCT/JP2008/059264

(51) Int. Cl.
- *B32B 3/12* (2006.01)
- *B01J 29/04* (2006.01)
- *B01J 29/06* (2006.01)

(52) U.S. Cl. ............... 428/116; 502/60; 502/67; 502/87

(58) Field of Classification Search .................. None
See application file for complete search history.

(56) References Cited

U.S. PATENT DOCUMENTS

| | | | |
|---|---|---|---|
| 6,413,898 B1 * | 7/2002 | Faber et al. ............ | 502/64 |
| 2002/0140138 A1 * | 10/2002 | Wu et al. ............ | 264/630 |
| 2006/0292339 A1 | 12/2006 | Ohno et al. | |
| 2006/0292393 A1 * | 12/2006 | Kunieda ............ | 428/688 |
| 2007/0259770 A1 | 11/2007 | Hofmann et al. | |
| 2007/0269352 A1 | 11/2007 | Miyairi et al. | |

FOREIGN PATENT DOCUMENTS

| | | |
|---|---|---|
| JP | 2675321 | 7/1997 |
| JP | 2004-024026 | 1/2004 |
| JP | 2004-202426 | 7/2004 |
| JP | 2007-296514 | 11/2007 |
| KR | 10-0725435 | 2/2007 |
| WO | WO 01/49409 | 7/2001 |
| WO | WO 2005/063653 | 7/2005 |
| WO | WO 2006/070540 | 7/2006 |

OTHER PUBLICATIONS

U.S. Appl. No. 12/379,768.
U.S. Appl. No. 12/516,813.
U.S. Appl. No. 12/407,645.
U.S. Appl. No. 12/248,625.
U.S. Appl. No. 12/271,216.
U.S. Appl. No. 12/368,514.
U.S. Appl. No. 12/346,628.
U.S. Appl. No. 12/346,610.
U.S. Appl. No. 12/367,780.
U.S. Appl. No. 12/358,937.

(Continued)

*Primary Examiner* — Gordon R Baldwin
(74) *Attorney, Agent, or Firm* — Ditthavong Mori & Steiner, P.C.

(57) ABSTRACT

A honeycomb structure includes a honeycomb unit which has zeolite, inorganic binder, and cell walls extending from one end to another end along a longitudinal direction of the honeycomb unit to define cells. An amount of zeolite contained per apparent unit volume of the honeycomb unit is approximately 230 g/L or more. Mathematical formulae [1] and [2] are satisfied when a thickness of the cell walls is defined as X mm and an average pore diameter of a surface of the cell walls observed by a microscope is defined as Y μm:

$$X+0.07 \leq Y \leq X+0.27 \quad [1]$$

$$\text{approximately } 0.15 \leq X \leq \text{approximately } 0.35 \quad [2].$$

30 Claims, 3 Drawing Sheets

OTHER PUBLICATIONS

U.S. Appl. No. 12/389,343.
U.S. Appl. No. 12/359,957.
U.S. Appl. No. 12/343,965.
U.S. Appl. No. 12/359,969.
U.S. Appl. No. 12/369,347.
U.S. Appl. No. 12/372,192.
U.S. Appl. No. 12/372,229.
U.S. Appl. No. 12/368,551.
U.S. Appl. No. 12/362,310.
U.S. Appl. No. 12/355,999.
U.S. Appl. No. 12/355,990.
Korean Office Action for corresponding KR Application No. 10-2009-0037283, Mar. 28, 2011.

* cited by examiner

HONEYCOMB STRUCTURE

CROSS-REFERENCE TO RELATED APPLICATION

The present application claims priority under 35 U.S.C. §119 to PCT International Application No. PCT/JP2008/059264, filed on May 20, 2008, the entire contents of which are hereby incorporated herein by reference.

BACKGROUND OF THE INVENTION

1. Field of the Invention

The present invention relates to a honeycomb structure.

2. Description of the Related Art

Many technologies have been developed for treating automotive exhaust gasses. However, since the amount of traffic has been increased, reducing the automotive exhaust gasses has not been sufficiently performed. The automotive exhaust gas emission control will be further tightened in Japan and the world. In the automotive exhaust gas emission control, NOx control in diesel vehicle exhaust gasses has been severely tightened. Conventionally, the amount of NOx has been reduced by controlling an engine combustion system; however, only controlling the engine combustion system has not been sufficient. In order to meet the control, as a diesel vehicle NOx treating system, a NOx reduction system called an SCR system which uses ammonia as a reducing agent has been proposed.

As a catalyst carrier which is used in the system, a honeycomb structure is known. In WO2005/063653, a honeycomb structure formed of honeycomb units is disclosed. In forming the honeycomb unit, a material is prepared by mixing γ alumina, ceria, zirconia, zeolite, and the like with inorganic fibers and an inorganic binder, the mixed material is molded into a honeycomb shape, and the honeycomb-shaped molded body is fired; with this, the honeycomb unit is formed.

In Japanese Patent 2675321, a NOx treating method is disclosed in which NOx in diesel engine exhaust gases is reduced by using ammonia. In the method, a honeycomb catalyst is used in which an equivalent diameter of a through hole of a cell is 1.5 to 5 mm, the thickness of cell walls is 0.3 to 0.9 mm, and a pore volume in a specific pore range of the total pore volume is 40% or more.

The entire contents of WO2005/063653 and Japanese Patent 2675321 are hereby incorporated by reference.

SUMMARY OF THE INVENTION

According to one aspect of the present invention, a honeycomb structure includes a honeycomb unit which has zeolite, inorganic binder, and cell walls extending from one end to another end along a longitudinal direction of the honeycomb unit to define cells. An amount of zeolite contained per apparent unit volume of the honeycomb unit is approximately 230 g/L or more. Mathematical formulae [1] and [2] are satisfied when a thickness of the cell walls is defined as X mm and an average pore diameter of a surface of the cell walls observed by a microscope is defined as Y μm:

$$X+0.07 \leq Y \leq X+0.27 \quad [1]$$

$$\text{approximately } 0.15 \leq X \leq \text{approximately } 0.35 \quad [2].$$

BRIEF DESCRIPTION OF THE DRAWINGS

Features and advantages of the present invention will become apparent from the following detailed description when read in conjunction with the accompanying drawings.

DETAILED DESCRIPTION OF THE PREFERRED EMBODIMENT

A honeycomb structure according to an embodiment of the present invention includes one or more honeycomb units containing zeolite and an inorganic binder and having a shape in which plural cells extending from one end to the another end along the long length direction of the honeycomb unit separated by cell walls are included. In the honeycomb unit, an amount of zeolite contained per apparent unit volume is approximately 230 g/L or more, and when a thickness of a cell wall is defined as X mm, and an average pore diameter of a surface of the cell wall observed by a microscope is defined as Y μm, Mathematical Formulae [1] and [2] are satisfied.

$$X+0.07 \leq Y \leq X+0.27 \quad [1]$$

$$\text{approximately } 0.15 \leq X \leq \text{approximately } 0.35 \quad [2]$$

The honeycomb structure according to the embodiment of the present invention includes one or more fired honeycomb units having a shape in which the plural cells extending from one end to the another end along the long length direction of the honeycomb unit are separated by cell walls. An example of the honeycomb structure according to the embodiment of the present invention is shown by a perspective view of FIG. 1A. In a honeycomb structure 1 shown in FIG. 1A, plural honeycomb units 2 are arrayed by being adhered by adhesive layers 5. In each of the honeycomb units 2, cells 3 are arrayed in parallel in the long length directions of the honeycomb unit 2.

It is preferable that the side surface (the surface parallel to through holes of the cells 3) of the honeycomb structure 1 be covered with a coating material layer 6 so as to maintain the strength of the honeycomb structure 1. As exemplified in a perspective view of FIG. 2, the honeycomb unit 2 of which the honeycomb structure 1 is formed includes the plural cells 3 extending in the long length direction of the honeycomb unit 2 and cell walls 4 for separating the plural cells 3.

Figure 2:
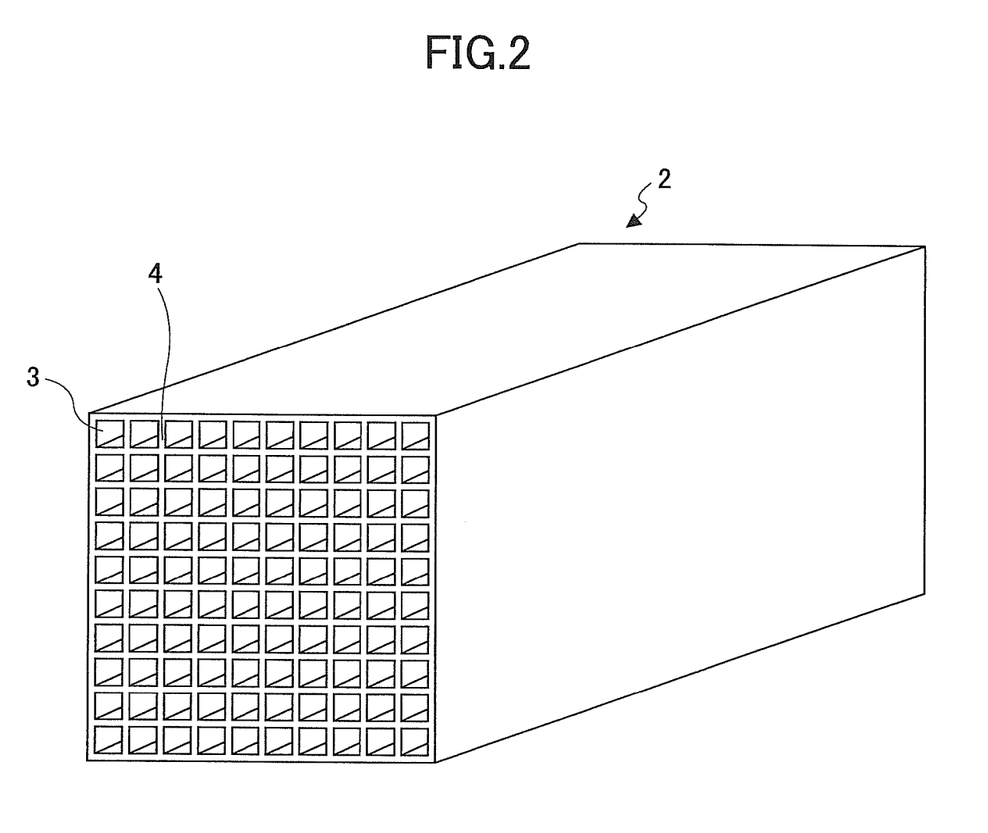
FIG. 2 is a perspective view of the honeycomb unit of which the honeycomb structure shown in FIG. 1A is formed.

In the honeycomb unit 2 of the honeycomb structure 1 according to the embodiment of the present invention, it is preferable that the amount of zeolite contained per apparent unit volume be approximately 230 g/L or more, more preferably, approximately 270 g/L or less, and still more preferably, approximately 245 to approximately 270 g/L. When the amount of zeolite contained per apparent unit volume is approximately 230 g/L or more, the NOx treating efficiency is hardly lowered. In addition, when the amount of zeolite contained per apparent unit volume is approximately 270 g/L or less, the strength of the honeycomb unit 2 and the honeycomb structure 1 is likely maintained.

However, in the honeycomb structure of WO2005/063653, in a case where the honeycomb unit is formed by using zeolite as the main material while molding and firing are applied to the material, there is a risk that the strength of the honeycomb unit is not sufficiently maintained when the amount of zeolite is particularly increased. Consequently, in some cases, the honeycomb structure formed of the honeycomb units cannot maintain a function as the NOx treating catalyst for the automotive exhaust gasses, in the SCR system.

In the honeycomb catalyst of Japanese Patent 2675321, the strength of the honeycomb catalyst is maintained by causing the thickness of the cell wall to be 0.3 mm or more. However, when the thickness of the cell wall is increased, the exhaust gasses hardly penetrate into the inside of the cell wall, an exhaust gas treating reaction is performed at only the surface of the cell wall, and there is a risk that all the cell walls are not effectively utilized. In order to solve the problem, when desirable treating efficiency is to be obtained for automotive exhaust gasses, an effective catalyst region must be increased; consequently, the size of the honeycomb catalyst must be large. Since the honeycomb catalyst is required to be small-sized and light weight, the honeycomb catalyst has a problem to be used as a NOx treating catalyst for the automotive exhaust gasses.

According to the embodiment of the present invention, a honeycomb structure can be obtained which has strength to be able to perform a function as an automotive exhaust gas treating catalyst when being installed in an automobile and effectively performs high treating efficiency for automotive exhaust gasses with a small size and light weight.

The inventors of the present invention have studied that the amount of zeolite contained per apparent unit volume, the thickness of the cell wall, and the pore diameter of the surface of the cell wall of the honeycomb unit influence the strength and the catalyst efficiency which are the basic units of the honeycomb structure. In order to increase the strength of the honeycomb unit, it is conceivable that the zeolite contained amount is lowered, the cell walls are densely arrayed, and the thickness of the cell wall is made to be thick. On the other hand, in order to increase the treating efficiency of the exhaust gasses, it is conceivable that the zeolite contained amount must be increased. In addition, in order to obtain a small-sized and light weight honeycomb unit, the thickness of the cell wall must be thin so that all the cell walls are effectively utilized by not only utilizing the surface of the cell wall, and the pore diameter of the cell wall must be great so that the exhaust gasses easily penetrate into the cell wall.

The inventors of the present invention have quantitatively studied a relationship among the above parameters and have found that a honeycomb structure satisfying the following conditional formulae is suitable as an automotive catalyst for treating NOx in the diesel engine exhaust gasses.

As described above, in the honeycomb unit 2 of the honeycomb structure 1 according to the embodiment of the present invention, when the thickness of the cell wall is defined as X mm, and the average pore diameter of the surface of the cell wall observed by a microscope is defined as Y μm, Mathematical Formulae [1] and [2] are satisfied.

$$X+0.07 \leq Y \leq X+0.27 \quad [1]$$

$$\text{approximately } 0.15 \leq X \leq \text{approximately } 0.35 \quad [2]$$

In the above, the average pore diameter is obtained by averaging pore diameters of the surface of the cell wall of the honeycomb unit observed by a microscope.

From a qualitative standpoint, when the average pore diameter Y of the surface of the cell wall of the honeycomb unit is made to be great, since the exhaust gasses easily penetrate into the surface, the utilization efficiency of the catalyst can be increased, and when the average pore diameter Y is made to be small, the strength of the honeycomb unit is conceivable to be increased. From a result of a quantitative study of the strength of the honeycomb unit and the NOx treating efficiency, it has been found that Mathematical Formula [1] must be satisfied.

When the average pore diameter Y of the surface of the cell wall of the honeycomb unit is beyond the upper limit of Mathematical Formula [1], the NOx treating efficiency is likely lowered. That is, when the average pore diameter Y of the surface of the cell wall of the honeycomb unit is made to be too great, from a view point to sustain the strength of the honeycomb unit, the number of pores must be decreased, and as a result, it conceivable that the exhaust gasses hardly penetrate into the inside of the cell wall and the NOx treating efficiency is lowered. In addition, even when the average pore diameter Y of the surface of the cell wall of the honeycomb unit is less than the lower limit of Mathematical Formula [1], the NOx treating efficiency is likely lowered. That is, when the average pore diameter Y of the surface of the cell wall of the honeycomb unit is too small, since the exhaust gasses hardly sufficiently penetrate into the pores, it conceivable that the NOx treating efficiency is lowered.

The average pore diameter Y of the surface of the cell wall of the honeycomb unit can be obtained by the following. That is, the surface of the cell wall is observed by using an SEM (scanning reflection electron microscope) or an optical microscope, the pores in an image within a predetermined region (for example, a square region of approximately 5 mm sides) are obtained as electronic information by an image process, and the average pore diameter is obtained.

The pores whose pore diameter is to be measured are so-called micro pores whose diameter is approximately 0.05 μm or more. Therefore, the magnification of the microscope can be 500 to 5000 times. The magnification of the microscope is more preferably 1000 to 3000 times, and it is still more preferable that the average pore diameter Y is obtained by observation with the use of an SEM whose magnification is 2000 times.

It is preferable that the thickness X of the cell wall of the honeycomb unit be approximately 0.15 mm to approximately 0.35 mm, and more preferably, approximately 0.15 mm to approximately 0.27 mm. When the thickness X of the cell wall is approximately 0.15 mm or more, the sufficient strength of the honeycomb unit 2 can be likely to be maintained. In addition, when the thickness X of the cell wall is approximately 0.35 mm or less, the exhaust gasses likely penetrate into the inside of the call wall, and the NOx treating efficiency is hardly lowered. In a case where the honeycomb structure is used as an automotive honeycomb catalyst, since the treating efficiency is hardly lowered, the size of the honeycomb structure needs not be great.

When the thickness X of the cell wall of the honeycomb unit is relatively small in the range of approximately 0.15 mm to approximately 0.35 mm, since the distance that the exhaust gasses penetrate into the cell wall can be small, the average pore diameter Y can be small to some extent. In addition, when the thickness X of the cell wall of the honeycomb unit is relatively great in the range of approximately 0.15 mm to approximately 0.35 mm, since the strength of the honeycomb unit is likely to be sustained, even if the average pore diameter Y of the surface of the cell wall is made to be great to some extent, the number of the pores is not necessary to be decreased; consequently, the NOx treating efficiency can be likely high.

Figure 3:
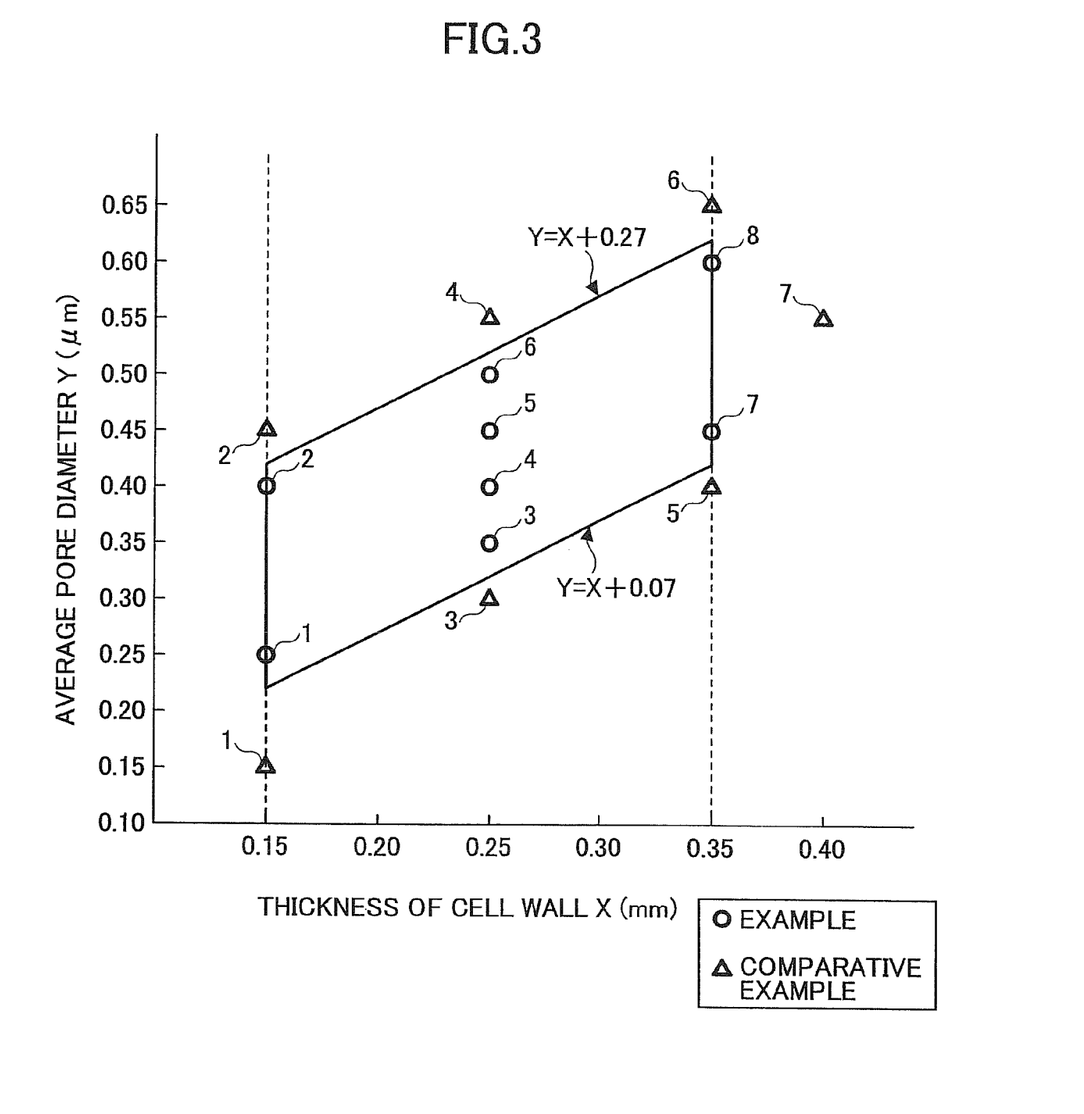
FIG. 3 is a graph showing a relationship between a thickness of a cell wall and an average pore diameter of the cell wall in the honeycomb units of examples and comparative examples in the embodiment of the present invention.

That is, when the honeycomb unit of the honeycomb structure according to the embodiment of the present invention is within a region defined by an upward sloping parallelogram shown in FIG. 3, it is understandable that the honeycomb structure can obtain sufficient strength and suitable NOx treating efficiency.

Next, the honeycomb structure 1 according to the embodiment of the present invention is specifically described.

[Honeycomb Unit]

As shown in FIG. 2, the honeycomb unit 2 of the honeycomb structure 1 according to the embodiment of the present invention has a so-called honeycomb structure having the plural cells 3 which are through holes arrayed in parallel. The cross-sectional shape of each cell 3 in the honeycomb unit 2 is not particularly limited. In FIG. 2, as an example, the cross-sectional shape of the cell 3 is square; however, the cross-sectional shape of the cell 3 can be approximately triangular, approximately hexagonal, approximately circular, or a combination of an approximately square with an approximately octagon.

The porosity of the cell wall 4 of the honeycomb unit 2 is preferably approximately 25 to approximately 40%. As described above, even if the average pore diameter Y is large to some extent, when the number of pores is extremely small, the exhaust gasses hardly penetrate into the back of the cell wall 4. In a quantitative study, when the porosity is approximately 25% or more, the exhaust gasses likely penetrate into the back of the cell wall 4, and the NOx treating efficiency may be hardly insufficient. In addition, when the porosity is approximately 40% or less, the strength of the cell wall 4 is hardly lowered.

The aperture ratio of opening parts of the cells 3 to the cross-sectional area (many-cell opening area) of the honeycomb unit 2 in the direction perpendicular to the long length direction (the direction parallel to the through holes) of the cells 3 is preferably approximately 50 to approximately 65%. The aperture ratio (opening ratio) of the honeycomb unit 2 is preferably approximately 50% or more so that a pressure loss of the exhaust gasses to be treated is hardly increased, and is preferably approximately 65% or less so that a sufficient area of the cell walls 4 for treating the exhaust gasses is obtained.

The honeycomb unit 2 contains zeolite and an inorganic binder, and further may contain inorganic particles other than zeolite and inorganic fibers.

[Zeolite]

Zeolite in the honeycomb unit 2 according to the embodiment of the present invention is a substance in which zeolite particles are bound by an inorganic binder. As the zeolite, there are, for example, β-type zeolite, Y-type zeolite, ferrierite, ZSM-5-type zeolite, mordenite, faujasite, zeolite A, zeolite L, and the like. The above zeolite can be used solely, or the above two or more can be used by mixing.

As the zeolite, the mole ratio of silica to alumina (silica/alumina ratio) is preferably approximately 30 to approximately 50.

In addition, the zeolite preferably contains ion exchanged zeolite of the above zeolite. The honeycomb unit 2 can be formed by using the ion exchanged zeolite or the ion exchange can be applied to the honeycomb unit 2 containing the zeolite after being formed. Ion exchanged zeolite is preferably used to which the ion exchange is applied by using at least one of metallic species of, for example, Fe, Cu, Ni, Co, Zn, Mn, Ti, Ag, and V. The ion exchanged zeolite can use one or more of the metallic species.

The amount of zeolite contained per apparent unit volume in the honeycomb unit 2 is preferably approximately 230 to approximately 270 g/L. From a different perspective, it is preferable that the zeolite contained ratio (composition ratio) in the honeycomb unit 2 be approximately 60 to approximately 80 mass %. Since the zeolite contributes to treat NOx, it is preferable that the contained amount of zeolite is great in the honeycomb unit 2. However, when only the zeolite contained amount is increased, the contained amount of the other materials (for example, the inorganic fibers and the inorganic binder) must be decreased, and the strength of the honeycomb unit 2 is likely lowered. In addition, in order to increase the zeolite contained amount, when the aperture ratio is made to be too small, the flowing resistance of the exhaust gasses becomes great in the NOx treating reaction.

The zeolite includes secondary particles, and the average particle diameter of the secondary particles is preferably approximately 0.5 to approximately 10 μm. The average particle diameter of the secondary particles can be measured by using raw zeolite particles of which the secondary particles are formed before applying a firing process to an uncompleted honeycomb unit.

[Inorganic Binder]

In the honeycomb unit 2, since water and the like in the inorganic binder are evaporated, only solids content of the inorganic binder remains. When the inorganic binder in the honeycomb unit 2 is referred to, the solids content in the honeycomb unit 2 is referred to as the inorganic binder.

As the raw inorganic binder, there are, for example, inorganic sol, a clay based binder, and the like. The inorganic sol is, for example, alumina sol, silica sol, titania sol, meerschaum sol, attapulgite sol, liquid glass, or the like. The clay based binder is, for example, white clay, kaolin, montmorillonite, multiple chain type clay (meerschaum, attapulgite), or the like. In addition, as the inorganic sol and the clay based binder, one of the above materials can be used solely, or two or more of the above materials can be mixed.

As the solids content, the amount of the inorganic binder in the honeycomb unit 2 is preferably approximately 5 to approximately 30 mass %, and more preferably, approximately 10 to approximately 20 mass %. When the amount of the inorganic binder in the honeycomb unit 2 is within the range of approximately 5 to approximately 30 mass %, as the solids content, moldability at forming the honeycomb unit 2 is hardly lowered.

[Inorganic Fibers]

The honeycomb unit 2 in the honeycomb structure 1 according to the embodiment of the present invention may contain inorganic fibers. The inorganic fibers to be contained in the honeycomb unit 2 are not particularly limited. However, the inorganic fibers are, for example, alumina fibers, silica fibers, silicon carbide fibers, silica-alumina fibers, glass fibers, potassium titanate fibers, aluminum borate fibers, or the like. As the inorganic fibers, one of the inorganic fibers can be used solely, or two or more above inorganic fibers can be mixed. The raw inorganic fibers are mixed with the zeolite particles and the inorganic binder and the honeycomb unit 2 is molded with the mixed substance, and the molded body is fired. The inorganic fibers contribute to increase the strength of the honeycomb unit 2. As the inorganic fibers, in addition to long fibers, short fibers such as whiskers can be used.

The inorganic fibers are an inorganic material which has a large aspect ratio (fiber length/fiber diameter) and are particularly effective to increase the bending strength. The aspect ratio of the inorganic fibers is preferably approximately 2 to approximately 1000, more preferably, approximately 5 to approximately 800, and still more preferably, approximately 10 to approximately 500. When the aspect ratio of the inorganic fibers is approximately 2 or more, the contribution to increase the strength of the honeycomb unit 2 is hardly small, and when the aspect ratio of the inorganic fibers is approximately 1000 or less, a clog is hardly to be generated in a molding die at forming the honeycomb unit 2 by molding and the moldability may be hardly lowered, and when the honeycomb unit 2 is formed by an extrusion molding, the inorganic fibers are hardly broken, the lengths of the inorganic fibers are hardly dispersed, and the strength of the honeycomb unit 2 is hardly lowered. In the above, when the aspect ratio has a distribution, the above aspect ratio signifies an average aspect ratio.

The amount of the inorganic fibers to be contained in the honeycomb unit 2 is preferably approximately 3 to approximately 50 mass %, more preferably, approximately 3 to approximately 30 mass %, and still more preferably, approximately 5 to approximately 20 mass %. When the contained amount of the inorganic fibers in the honeycomb unit 2 is approximately 3 mass % or more, the contribution to increase the strength of the honeycomb unit 2 is hardly small, and when the contained amount of the inorganic fibers in the honeycomb unit 2 is approximately 50 mass % or less, the contained amount of the zeolite particles for contributing to the NOx treatment hardly becomes relatively small, and hence the NOx treating efficiency is hardly lowered.

[Inorganic Particles]

The honeycomb unit 2 in the honeycomb structure 1 according to the embodiment of the present invention may contain inorganic particles other than the zeolite particles. The inorganic particles other than the zeolite particles have a function to increase the strength of the honeycomb unit 2. In the honeycomb structure 1 according to the embodiment of the present invention, the inorganic particles other than the zeolite particles to be contained in the honeycomb unit 2 are not particularly limited. However, as the inorganic particles other than the zeolite particles, there are, for example, alumina particles, silica particles, zirconia particles, titania particles, ceria particles, mullite particles, a precursor of the above particles, and the like. The alumina particles and the zirconia particles are preferably used, and as the raw material, γ-alumina or boehmite is suitably used. In addition, one of the above inorganic particles other than the zeolite particles can be used solely, or the above two or more particles can be used.

The inorganic particles in the honeycomb structure 1 according to the embodiment of the present invention include a hydroxyl group before being fired as raw inorganic particles. Similar to many inorganic compound particles which can be industrially used, raw zeolite particles and raw inorganic particles other than the zeolite particles before the honeycomb unit 2 of the honeycomb structure 1 according to the embodiment of the present invention is fired, is conceivable to include the hydroxyl group. When the honeycomb unit 2 is fired, the hydroxyl group generates a dehydration condensation reaction, and binding among the particles is conceivable to be strengthened. In particular, raw inorganic particles including alumina particles or the like are conceivable to be firmly bound by the dehydration condensation reaction at the firing.

In the honeycomb unit 2 of the honeycomb structure 1 according to the embodiment of the present invention, it is preferable that the average particle diameter of the secondary particles of the raw inorganic particles other than the zeolite particles be the average particle diameter of the secondary particles of the zeolite particles or less. In particular, the average particle diameter of the secondary particles of the raw inorganic particles other than the zeolite particles is preferably approximately 1/10 to approximately 1/1 the average particle diameter of the secondary particles of the zeolite particles. With this, the strength of the honeycomb unit 2 is can be likely increased by the binding force of the inorganic particles whose average particle diameter is small.

The contained amount of the inorganic particles other than the zeolite particles in the honeycomb unit 2 is preferably approximately 3 to approximately 30 mass %, and more preferably approximately 5 to approximately 20 mass %. When the contained amount of the inorganic particles other than the zeolite particles in the honeycomb unit 2 is approximately 3 mass % or more, contribution to increase the strength of the honeycomb unit 2 is hardly lowered. When the contained amount of the inorganic particles other than the zeolite particles in the honeycomb unit 2 is approximately 30 mass % or less, the contained amount of the zeolite particles for contributing to the NOx treatment hardly becomes relatively small, and hence the NOx treating efficiency is hardly lowered.

[Catalyst Components]

Catalyst components may be further carried on the cell walls 4 of the honeycomb unit 2 in the honeycomb structure 1 according to the embodiment of the present invention. The catalyst components are not particularly limited. However, the catalyst components can be formed of noble metal, an alkali metal compound, an alkali earth metal compound, or the like. As the noble metal, there are, for example, platinum, palladium, rhodium, or the like. One of the noble metals can be used solely, or two or more the noble metals can be mixed. As the alkali metal compounds, there are, for example, a single or two or more compounds selected from a potassium compound, a sodium compound, and the like. In addition, as the alkali earth metal compounds, there are, for example, a barium compound and the like.

[Manufacturing Method of Honeycomb Unit]

Next, an example of a manufacturing method of the honeycomb unit 2 in the honeycomb structure 1 according to the embodiment of the present invention is described. First, a raw material paste containing zeolite particles and an inorganic binder as the main components is prepared, and a honeycomb unit molded body is formed of the raw material paste by using extrusion molding or the like. In addition, inorganic fibers, inorganic particles, an organic binder, a pore forming agent, a dispersion medium, a molding aid, and the like may be arbitrarily added to the raw material paste.

The organic binder is not particularly limited, however, as the organic binder, there are, for example, methylcellulose, carboxymethyl cellulose, hydroxylethyl cellulose, polyethyleneglycole, phenol resin, epoxy resin, and the like. One or more of the above organic binders can be selected. When the organic binder is added into the original raw material paste, the preferable adding ratio of the organic binder to the original raw material paste is approximately 1 to approximately 10 mass % to the total 100 mass % of the solid components of the raw material paste.

As the pore forming agent, powders formed of acrylic acid based resin, polyolefin based resin, polystyrene based resin, polyester based resin, and the like can be used. The organic binder and the pore forming agent are important at the extrusion molding and to adjust the average pore diameter Y and the porosity of the honeycomb unit 2, and the amount of the pore forming agent is adjusted corresponding a desirable average pore diameter Y and a desirable porosity. The dispersion medium is not particularly limited. As the dispersion medium, there are, for example, water, organic solvent (for example, toluene), alcohol (for example, methanol), and the like. The molding aid is not particularly limited, however, as the molding aid, there are, for example, ethylene glycol, dextrin, fatty acid soap, polyalcohol, and the like.

The raw material paste is not particularly limited; however, it is preferably mixed and kneaded. The raw material paste can be sufficiently mixed by using a mixer, an attritor (grinding mill), or the like, and can be sufficiently kneaded by a kneader or the like. The molding method of the raw material paste is not particularly limited; however, a honeycomb unit molded body is preferably formed by using, for example, an extrusion molding method or the like so that the honeycomb unit molded body has a predetermined cell density and a predetermined aperture ratio.

Next, the honeycomb unit molded body is dried. A drying apparatus for drying the honeycomb unit molded body is not particularly limited. As the drying apparatus, there are, for example, a microwave drying apparatus, a hot air drying apparatus, a dielectric drying apparatus, a reduced pressure drying apparatus, a vacuum drying apparatus, a freeze drying apparatus, and the like. The dried honeycomb unit molded body is preferably degreased. The degreasing conditions are not particularly limited and are determined depending on the amount and kind of organic substances contained in the honeycomb unit molded body; however, the honeycomb unit molded body is preferably degreased under the conditions of at approximately 400° C. for approximately 2 hours.

Further, the dried and degreased honeycomb unit molded body is fired. The firing conditions are not particularly limited; however, are preferably at approximately 600 to approximately 1200° C. for approximately 2 hours, more preferably at approximately 600 to approximately 1000° C. for approximately 2 hours. When the firing temperature is approximately 600° C. or more, the sintering likely progresses, and the strength of the honeycomb unit 2 is likely increased. When the firing temperature is approximately 1200° C. or less, since zeolite crystals are hardly broken and the sintering is not too progressed, the honeycomb unit 2 having a porous property with a suitable porosity can be likely formed.

[Honeycomb Structure]

Figure 1A:
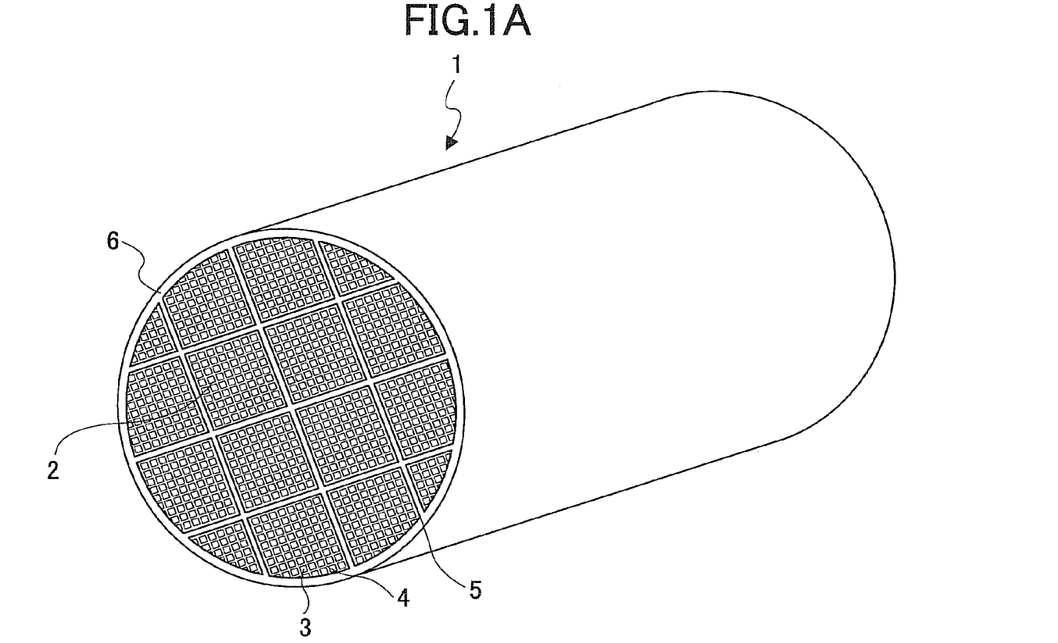
FIG. 1A is a perspective view of a honeycomb structure formed of plural honeycomb units according to an embodiment of the present invention.
Figure 1B:
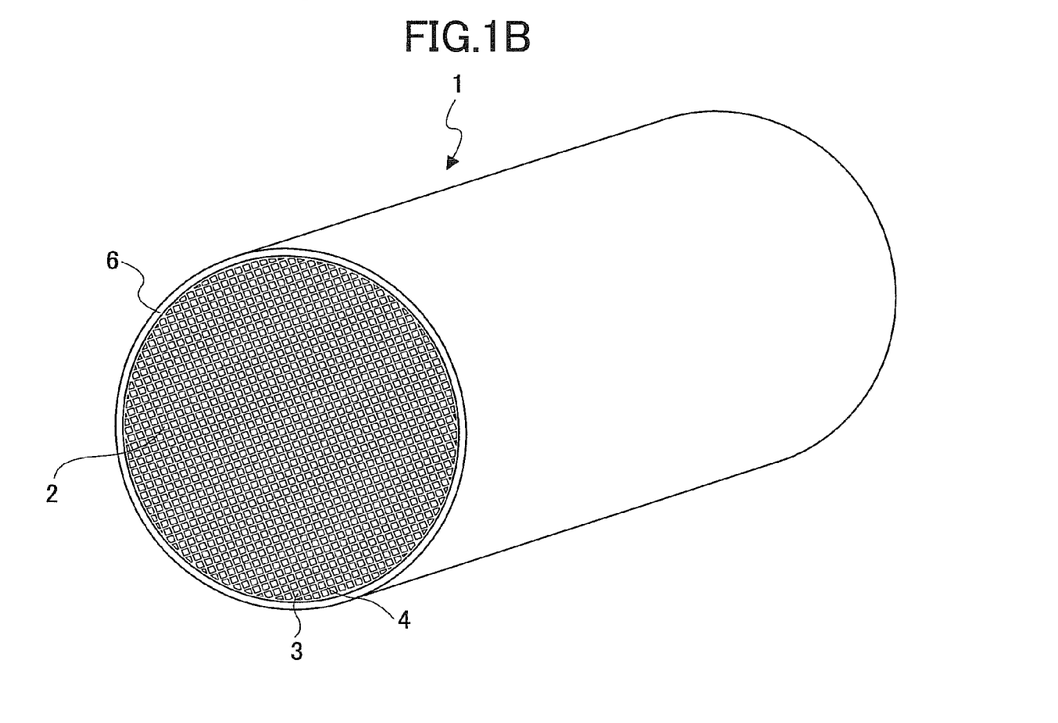
FIG. 1B is a perspective view of a honeycomb structure formed of a single honeycomb unit according to the embodiment of the present invention.

The honeycomb structure 1 according to the embodiment of the present invention includes one or more honeycomb units 2. In the honeycomb structure 1 including the plural honeycomb units 2, the plural honeycomb units 2 are stacked so that the through holes of the cells 3 in each honeycomb unit 2 face in the same direction. Examples of the honeycomb structures 1 according to the embodiment of the present invention are shown in corresponding perspective views of FIGS. 1A and 1B. The honeycomb structure 1 shown in FIG. 1A is formed so that the plural honeycomb unit 2 are adhered by the adhesive layers 5. In each of the honeycomb units 2, the cells 3 are arrayed in parallel. The honeycomb structure 1 shown in FIG. 1B is an example in which the honeycomb structure 1 is formed of one honeycomb unit 2. As described above, the honeycomb structure 1 may be formed of one honeycomb unit 2 or plural honeycomb units 2. The side surface (surface parallel to the long length direction of the cells 3, in some cases, hereinafter the surface is simply referred to as a side face) is preferably covered with the coating material layer 6 so as to increase the strength of the honeycomb structure 1.

In the honeycomb structures 1 according to the embodiment of the present invention shown in FIGS. 1A and 1B, the cross-sectional face has a circular shape; however, the cross-sectional face can have any shape, for example, a square shape, a rectangular shape, a hexagonal shape, a fan shape, and the like. The cross-sectional shape of the honeycomb structure 2 may be determined depending on using conditions; however, the cross-sectional area in the long length direction of the honeycomb structure 1 is preferably the same. In addition, a cutting process may be applied or not be applied to a peripheral surface of the honeycomb structure 1.

[Manufacturing Method of Honeycomb Structure]

A manufacturing method of the honeycomb structure 1 formed of the plural honeycomb units 2 shown in FIG. 1A is described. The honeycomb units 2 obtained by the above manufacturing method are sequentially adhered to each other by applying an adhesive onto the sides of the honeycomb units 2, and the adhered honeycomb units 2 are dried and solidified. With this, a honeycomb unit aggregated body having a predetermined size is obtained. In addition, a cutting process is applied to the side face of the honeycomb unit aggregated body, and a honeycomb structure having a predetermined shape is formed.

The adhesive is not particularly limited. As the adhesive, for example, a substance mixing an inorganic binder with inorganic fibers, a substance mixing an inorganic binder with inorganic particles and inorganic fibers, or the like can be used. In addition, an organic binder may be added to the above adhesive. The organic binder is not particularly limited. As the organic binder, there are, for example, polyvinyl alcohol, methylcellulose, ethylcellulose, carboxymethyl cellulose, and the like, and one or more of the above organic binders can be selected.

The thickness of the adhesive layer 5 for adhering the plural honeycomb units 2 is preferably, approximately 0.5 to approximately 2.0 mm. The number of the honeycomb units 2 to be adhered may be arbitrarily determined depending on the size of the honeycomb structure 1. A cutting process and/or a polishing process may be applied to the honeycomb unit aggregated body formed by adhering the plural honeycomb units 2 for obtaining the honeycomb structure 1 having a desirable shape.

The coating material layer 6 is formed on a peripheral surface of the honeycomb structure 2 where the through holes of the cells 3 are not formed by applying a coating material and drying and solidifying the coating material. With this, the peripheral surface of the honeycomb structure 1 is protected and the strength of the honeycomb structure 1 can be increased. The coating material is not particularly limited, and can be the same as the material of the adhesive layer 5, or can be different from the material of the adhesive layer 5. The compounding ratio of the coating material can be the same as that of the adhesive or can be different from the adhesive. The thickness of the coating material layer 6 is not particularly limited, but is preferably approximately 0.1 mm to approximately 2.0 mm. The coating material layer 6 may be or may not be formed.

After adhering the plural honeycomb units 2 by using the adhesive, heat treatment is preferably applied to the adhered honeycomb units 2. When the coating material layer 6 is formed, a degreasing process is preferably applied after forming the adhesive layers 5 and the coating material layer 6. When the adhesive layers 5 and the coating material layer 6 contain an organic binder, the organic binder can be degreased by the degreasing process. The degreasing conditions can be arbitrarily determined depending on the contained amount and kind of the organic binder; however, the degreasing conditions are preferably at approximately 700° C. for approximately 2 hours.

As an example of a honeycomb structure, the honeycomb structure 1 having a cylindrical shape is shown in FIG. 1A in which plural honeycomb units 2 having a rectangular pillar shape whose cross section perpendicular to the long length direction of cells 3 is a square are adhered. In the honeycomb structure 1, the honeycomb units 2 are adhered by the adhesive layer 5, the outer peripheral is cut to have the cylindrical shape, and the coating material layer 6 is formed on the peripheral surface. For example, when honeycomb units 2 having an approximately fan shape and an approximately square shape in the cross section are formed and the honeycomb units 2 are adhered to have a predetermined shape of the honeycomb structure 1, the cutting process and the polishing process can be omitted.

Next, a manufacturing method of the honeycomb structure 1 formed of one honeycomb unit 2 shown in FIG. 1B is described. The honeycomb structure 1 formed of one honeycomb unit 2 shown in FIG. 1B can be formed by a method similar to the manufacturing method of the honeycomb structure 1 formed of the plural honeycomb units 2 shown in FIG. 1A. In addition, if necessary, in order to have a cylindrical shape, the honeycomb structure 1 is formed by applying a cutting and/or a polishing process and by forming the coating material layer 6 on the peripheral surface with the use of the same material of the adhesive and the degreasing process is applied. With this, the honeycomb structure 1 formed of one honeycomb unit 2 can be formed.

EXAMPLES

Next, examples of the honeycomb structures manufactured under several conditions are described. However, the embodiment of the present invention is not limited to the examples.

Example 1

[Manufacturing of Honeycomb Unit]

First, 2250 parts by mass of Fe-zeolite particles (3 mass % of Fe ion exchanged β-type zeolite, the silica/alumina ratio is 40, the specific surface area is 110 m$^2$/g, and the average particle diameter is 2 μm (the average diameter is the average diameter of the secondary particles; the description below is the same)), 980 parts by mass of alumina fibers (the average fiber diameter is 6 μm and the average fiber length is 100 μm), 2600 parts by mass of alumina sol (the solids content is 20 mass %), 410 parts by mass of methylcellulose as an organic binder, and 200 parts by mass of acrylic resin powders (the average particle diameter is 0.75 μm) as a pore forming agent were added and mixed. Further, a small amount of platicizer, a surfactant, and a lubricant was added to the mixed substance, and the added substance was mixed and kneaded while adjusting the viscosity by adding water. With this, a mixture composition substance for molding was obtained.

Then a raw honeycomb unit molded body was obtained by molding the mixture composition substance with the use of an extrusion molding machine.

Next, the raw honeycomb unit molded body was sufficiently dried by using a microwave drying apparatus and a hot air drying apparatus and degreased at 400° C. for 2 hours. Then firing was applied to the dried and degreased honeycomb unit molded body at 700° C. for 2 hours. With this, the honeycomb unit 2 was formed. In the formed honeycomb unit 2, the shape was a rectangular pillar shape (cross section 35 mm×35 mm×length 150 mm), the thickness of the cell wall 4 was 0.15 mm, the cell density was 160 pieces/cm$^2$, the average pore diameter was 0.25 μm, the amount of zeolite contained per apparent unit volume was 250 g/L, the porosity was 35%, the aperture ratio was 60%, and the cell shape was a square.

The Fe ion exchanged β-type zeolite was obtained by performing a Fe ion exchange while zeolite particles were soaked in a ferric nitrate ammonium solution. The ion exchanged amount was obtained by an IPC luminescent analysis with the use of an ICPS-8100 (a product of Shimadzu).

The thickness X of the cell wall 4 of the cell 3 of the honeycomb unit 2 was measured by using a length measuring microscope, and obtained by averaging the measured results of 10 samples.

A square of 5 mm sides of the surface of the cell wall 4 of the honeycomb unit 2 was cut off, transparent resin was applied to the cut-off part and the surface was polished, and this was made to be a sample for observation. The average pore diameter Y of the surface of the cell wall 4 was obtained by observing the sample by using a microscope. The sample for observation was observed by an SEM (the magnification was 2000), the observed SEM image was input to a personal computer and a binarizing process was applied to the image, and the average pore diameter Y was measured.

In Table 1, the particle diameter of the pore forming agent used to form the honeycomb unit, the cell structure (the thickness X of the cell wall 4 of the honeycomb unit, and the cell density), the average pore diameter Y, the upper limit, the lower limit of the average pore diameter Y in Mathematical Formula [1], and the like were shown.

TABLE 1

| | [Manufacturing of Honeycomb Structure] | | | | | | |
|---|---|---|---|---|---|---|---|
| | DIAMETER OF PORE FORMING AGENT μm | CELL STRUCTURE | | AVERAGE PORE DIAMETER Y μm | MATHEMATICAL FORMULA [1] | | EVALUATION NOx TREATING EFFICIENCY % |
| | | THICKNESS X OF CELL WALL mm | CELL DENSITY pieces/cm$^2$ | | LOWER LIMIT Y = X + 0.07 | UPPER LIMIT Y = X + 0.27 | |
| EXAMPLE 1 | 0.75 | 0.15 | 160 | 0.25 | 0.22 | 0.42 | 95 |
| EXAMPLE 2 | 1.5 | 0.15 | 160 | 0.40 | 0.22 | 0.42 | 92 |
| EXAMPLE 3 | 1.3 | 0.25 | 60 | 0.35 | 0.32 | 0.52 | 91 |
| EXAMPLE 4 | 1.5 | 0.25 | 60 | 0.40 | 0.32 | 0.52 | 95 |
| EXAMPLE 5 | 2.0 | 0.25 | 60 | 0.45 | 0.32 | 0.52 | 94 |
| EXAMPLE 6 | 2.25 | 0.25 | 60 | 0.50 | 0.32 | 0.52 | 90 |
| EXAMPLE 7 | 2.0 | 0.35 | 30 | 0.45 | 0.42 | 0.62 | 85 |
| EXAMPLE 8 | 2.75 | 0.35 | 30 | 0.60 | 0.42 | 0.62 | 88 |
| COMPARATIVE EXAMPLE 1 | 0.5 | 0.15 | 160 | 0.15 | 0.22 | 0.42 | 78 |
| COMPARATIVE EXAMPLE 2 | 2.0 | 0.15 | 160 | 0.45 | 0.22 | 0.42 | 79 |
| COMPARATIVE EXAMPLE 3 | 1.0 | 0.25 | 60 | 0.30 | 0.32 | 0.52 | 76 |

TABLE 1-continued

[Manufacturing of Honeycomb Structure]

| | DIAMETER OF PORE FORMING AGENT μm | CELL STRUCTURE | | | MATHEMATICAL FORMULA [1] | | EVALUATION |
|---|---|---|---|---|---|---|---|
| | | THICKNESS X OF CELL WALL mm | CELL DENSITY pieces/cm$^2$ | AVERAGE PORE DIAMETER Y μm | LOWER LIMIT Y = X + 0.07 | UPPER LIMIT Y = X + 0.27 | NOx TREATING EFFICIENCY % |
| COMPARATIVE EXAMPLE 4 | 2.5 | 0.25 | 60 | 0.55 | 0.32 | 0.52 | 78 |
| COMPARATIVE EXAMPLE 5 | 1.5 | 0.35 | 30 | 0.40 | 0.42 | 0.62 | 74 |
| COMPARATIVE EXAMPLE 6 | 3.0 | 0.35 | 30 | 0.65 | 0.42 | 0.62 | 77 |
| COMPARATIVE EXAMPLE 7 | 2.5 | 0.40 | 25 | 0.55 | 0.47 | 0.67 | 74 |

Next, a paste of adhesive was applied onto the side faces of the formed honeycomb units 2 so that the thickness of the adhesive layer 5 became 1 mm, and a honeycomb unit aggregated body having a nearly rectangular pillar shape was formed in which the four honeycomb units 2 were arrayed in the row direction and the four honeycomb units 2 were arrayed in the column direction by being adhered and the honeycomb unit aggregated body was dried and solidified at 120° C. for 2 hours.

The paste of the adhesive layer 5 was prepared by mixing 29 mass % of aluminum particles (the average particle diameter was 2 μm), 7 mass % of alumina fibers (the average fiber diameter was 6 μm, and the average fiber length was 100 μm), 34 mass % of alumina sol (the solids content 20 mass %), 5 mass % of carboxymethyl cellulose, and 25 mass % of water.

The side faces of the honeycomb unit aggregated body were cut by using a diamond cutter so that the honeycomb unit aggregated body had a cylindrical shape. The paste of the adhesive is applied onto the peripheral surface of the honeycomb unit aggregated body having the cylindrical shape so that the coating material layer 6 of 0.5 mm thickness was formed. With this, the honeycomb unit aggregated body having the same structure as that of the honeycomb structure 1 shown in FIG. 1A was formed. The honeycomb unit aggregated body having the cylindrical shape was dried and solidified at 120° C. for 2 hours, and the adhesive layers 5 and the coating material layer 6 were degreased at 700° C. for 2 hours. With this, a cylindrical-shaped honeycomb structure 1 (the diameter was 144 mm, and the length was 150 mm) was obtained.

Examples 2 Through 8 and Comparative Examples 1 Through 7

Honeycomb units and honeycomb structures of corresponding examples 2 through 8 according to the embodiment of the present invention and comparative examples 1 through 7 were formed by changing the particle diameter of the pore forming agent and a molding die of the extrusion molding machine with the use of a method similar to the method of forming the honeycomb unit 2 and the honeycomb structure 1 of the example 1. In Table 1, as described above, the thickness X of the cell wall and the cell density, the average pore diameter Y, the upper limit and the lower limit of the average pore diameter Y in Mathematical Formula [1], and the like of the honeycomb units and the honeycomb structures of corresponding examples 1 through 8 and comparative example 1 through 7 were shown.

[Evaluation of NOx Treating Efficiency of Honeycomb Structures]

NOx treating efficiency in each of the honeycomb structures formed in corresponding examples 1 through 8 and comparative examples 1 through 7 according to the embodiment of the present invention was measured.

A cylindrical-shaped honeycomb whose diameter is 30 mm and the length is 50 mm was cut off from each of the honeycomb units of the examples 1 through 8 and the comparative examples 1 through 7, and the cut-off honeycomb was used as a sample for evaluation. After applying a simulation aging to each sample for evaluation by heating at 700° C. for 48 hours, the temperature was sustained at 300° C., simulation gasses of automotive exhaust gasses whose composition is shown in Table 2 were heated at 300° C., and were introduced by SV35000 (space velocity of 35000/hr). Then, a reduction rate (%) of NO components in the simulation gases between the start of the simulation and the end of the simulation was determined to be NOx treating efficiency (%). In Table 2, the SV is also shown.

Measured results of the NOx treating efficiency (%) of the samples for evaluation in the examples 1 through 8 according to the embodiment of the present invention and the comparative examples 1 through 7 were shown in Table 1.

TABLE 2

| SIMULATION GAS | MIXED AMOUNT |
|---|---|
| $N_2$ | Balance |
| $CO_2$ | 5 vol % |
| $O_2$ | 14 vol % |
| NO | 350 ppm |
| $NH_3$ | 350 ppm |
| $H_2O$ | 5 vol % |
| SV | 35000/hr |

As is understood from the results shown in Table 1, the NOx treating efficiency of the honeycomb units (samples for evaluation) of the examples 1 through 8 was high at 85% or more; however, the NOx treating efficiency of the honeycomb units (samples for evaluation) of the comparative examples 1 through 7 was low at less than 80%.

A relationship between the average pore diameter Y and the thickness X of the cell wall of the honeycomb units of the examples 1 through 8 according to the embodiment of the present invention and the comparative examples 1 through 7 is shown in FIG. 3. In FIG. 3, the horizontal axis shows the thickness of the cell wall X and the vertical axis shows the average pore diameter Y of the honeycomb units. In addition, the examples 1 through 8 are shown by "○" and the comparative examples 1 through 7 are shown by "Δ", and the numeral attached to the "○" and the "Δ" shows the number of the corresponding examples 1 through 8 and comparative examples 1 through 7.

It is understandable from the graph shown in FIG. 3 that the honeycomb units of the examples 1 through 8 according to the embodiment of the present invention are within a region satisfying Mathematical Formulae [1] and [2], and the honeycomb units of the comparative examples 1 through 7 are outside the region satisfying Mathematical Formulae [1] and [2].

Therefore, it is understandable that the honeycomb structures of the examples 1 through 8 according to the embodiment of the present invention are suitable for treating automotive exhaust gases.

Since the honeycomb structure according to the embodiment of the present invention tends to have high NOx treating efficiency, the honeycomb structure can be used as a catalyst for treating automotive exhaust gasses which is required to be small-sized and light weight. In particular, the honeycomb structure is suitable as a NOx treating catalyst for the SCR system (for example, a diesel engine exhaust gas treating system using ammonia) using zeolite.

Further, the present invention is not limited to the embodiment, but variations and modifications may be made without departing from the scope of the present invention.

What is claimed is:

1. A honeycomb structure comprising:
   a honeycomb unit comprising:
      zeolite an amount of which contained per apparent unit volume of the honeycomb unit is approximately 230 g/L or more;
      inorganic binder; and
      cell walls extending from one end to another end along a longitudinal direction of the honeycomb unit to define cells,
   wherein the zeolite and the organic binder are components of a material used to form the honeycomb unit including the cell walls,
   wherein mathematical formulae [1] and [2] are satisfied when a thickness of the cell walls is defined as X mm and an average pore diameter of a surface of the cell walls observed by a microscope is defined as Y μm:

$$X+0.07 \leq Y \leq X+0.27 \quad [1]$$

$$\text{approximately } 0.15 \leq X \leq \text{approximately } 0.35 \quad [2].$$

2. The honeycomb structure as claimed in claim 1, wherein:
   the amount of zeolite contained per apparent unit volume of the honeycomb unit is approximately 270 g/L or less.

3. The honeycomb structure as claimed in claim 1, wherein:
   a porosity of the cell walls is approximately 25% to approximately 40%.

4. The honeycomb structure as claimed in claim 1, wherein:
   an aperture ratio of the honeycomb unit is approximately 50% to approximately 65%.

5. The honeycomb structure as claimed in claim 1, wherein:
   the zeolite includes at least one of β-type zeolite, Y-type zeolite, ferrierite, ZSM-5-type zeolite, mordenite, faujasite, zeolite A, and zeolite L.

6. The honeycomb structure as claimed in claim 1, wherein:
   a mole ratio of silica to alumina (silica/alumina ratio) in the zeolite is approximately 30 to approximately 50.

7. The honeycomb structure as claimed in claim 1, wherein:
   the zeolite is ion-exchanged zeolite by using at least one of Fe, Cu, Ni, Co, Zn, Mn, Ti, Ag, and V.

8. The honeycomb structure as claimed in claim 1, wherein:
   the honeycomb unit includes at least one of alumina particles, titania particles, silica particles, zirconia particles, ceria particles, mullite particles, and a precursor of the above particles.

9. The honeycomb structure as claimed in claim 1, wherein:
   the inorganic binder includes at one of alumina sol, silica sol, titania sol, liquid glass, meerschaum sol, and attapulgite sol.

10. The honeycomb structure as claimed in claim 1, wherein:
    the honeycomb unit includes inorganic fibers.

11. The honeycomb structure as claimed in claim 10, wherein:
    the inorganic fibers include at least one of alumina fibers, silica fibers, silicon carbide fibers, silica-alumina fibers, glass fibers, potassium titanate fibers, and aluminum borate fibers.

12. The honeycomb structure as claimed in claim 1, wherein:
    a plurality of the honeycomb units are adhered together by interposing an adhesive.

13. The honeycomb structure as claimed in claim 1, wherein:
    a side surface of the honeycomb structure is covered with a coating material layer.

14. The honeycomb structure as claimed in claim 1, wherein:
    the amount of zeolite contained per apparent unit volume is approximately 245 g/L to approximately 270 g/L.

15. The honeycomb structure as claimed in claim 1, wherein:
    the zeolite contained amount in the honeycomb unit is approximately 60 mass % to approximately 80 mass %.

16. The honeycomb structure as claimed in claim 1, wherein:
    the zeolite includes secondary particles, and an average particle diameter of the secondary particles of the zeolite is approximately 0.5 μm to approximately 10 μm.

17. The honeycomb structure as claimed in claim 1, wherein:
    the inorganic binder is inorganic sol or a clay based binder.

18. The honeycomb structure as claimed in claim 1, wherein:
    an amount of the inorganic binder in the honeycomb unit is approximately 5 mass % to approximately 30 mass %, as the solids content.

19. The honeycomb structure as claimed in claim 10, wherein:
    an aspect ratio of the inorganic fibers is approximately 2 to approximately 1000.

20. The honeycomb structure as claimed in claim 10, wherein:
    an amount of the inorganic fibers contained in the honeycomb unit is approximately 3 mass % to approximately 50 mass %, 21. The honeycomb structure as claimed in claim 8, wherein:

an average particle diameter of secondary particles of inorganic particles other than the zeolite particles is an average particle diameter of the secondary particles of the zeolite particles or less.

22. The honeycomb structure as claimed in claim 8, wherein:
an average particle diameter of secondary particles of inorganic particles other than the zeolite particles is approximately 1/10 to approximately 1/1 of an average particle diameter of secondary particles of the zeolite particles.

23. The honeycomb structure as claimed in claim 8, wherein:
the contained amount of the inorganic particles other than the zeolite particles in the honeycomb unit is approximately 3 mass % to approximately 30 mass %.

24. The honeycomb structure as claimed in claim 1, wherein:
catalyst components are carried on the cell walls of the honeycomb unit.

25. The honeycomb structure as claimed in claim 24, wherein:
the catalyst components are formed at least one of noble metal, an alkali metal compound, and an alkali earth metal compound.

26. The honeycomb structure as claimed in claim 1, wherein:
the honeycomb structure is formed of one honeycomb unit.

27. The honeycomb structure as claimed in claim 1, wherein:
a cutting process is applied to a peripheral surface of the honeycomb unit.

28. The honeycomb structure as claimed in claim 12, wherein:
the honeycomb structure is formed to have a predetermined shape by adhering honeycomb units whose cross-sectional face has an approximately fan shape and honeycomb units whose cross-sectional face has an approximately square shape.

29. The honeycomb structure as claimed in claim 1, wherein:
the honeycomb structure is so constructed to be used as a catalyst for treating automotive exhaust gasses.

30. The honeycomb structure as claimed in claim 29, wherein:
the honeycomb structure is so constructed to be used as an NOx treating catalyst for an SCR system.

* * * * *